(12) United States Patent
Nielson

(10) Patent No.: US 8,544,362 B2
(45) Date of Patent: Oct. 1, 2013

(54) CRANKSHAFT FLANGE PROTECTOR AND SUPPORT ASSEMBLY

(75) Inventor: Curtis L. Nielson, Grand Prairie, TX (US)

(73) Assignee: SpeedRanger Aviation, LLC, Grand Prairie, TX (US)

( * ) Notice: Subject to any disclaimer, the term of this patent is extended or adjusted under 35 U.S.C. 154(b) by 56 days.

(21) Appl. No.: 13/151,840

(22) Filed: Jun. 2, 2011

(65) Prior Publication Data

US 2012/0304814 A1  Dec. 6, 2012

(51) Int. Cl.
*F16C 3/04* (2006.01)
*F16P 1/00* (2006.01)

(52) U.S. Cl.
USPC .............................................. 74/595; 74/609

(58) Field of Classification Search
USPC ................... 464/170; 211/203; 74/595, 608, 74/609; 206/319, 335
See application file for complete search history.

(56) References Cited

U.S. PATENT DOCUMENTS

| | | | |
|---|---|---|---|
| 1,186,547 A * | 6/1916 | Chapman | 74/595 |
| 2,494,569 A | 1/1950 | McMaster | |
| 2,884,661 A * | 5/1959 | Hurley | 74/595 X |
| 3,889,718 A | 6/1975 | Owings et al. | |
| 3,988,821 A | 11/1976 | Daniels et al. | |
| 4,250,667 A | 2/1981 | Favrot | |
| 4,919,408 A | 4/1990 | Muir | |
| 6,663,494 B2 * | 12/2003 | Curi | 464/170 |
| 7,690,869 B2 * | 4/2010 | Yo et al. | |
| 2010/0119339 A1 * | 5/2010 | Prinz et al. | |

FOREIGN PATENT DOCUMENTS

DE  10019584 A1  10/2001

* cited by examiner

*Primary Examiner* — Gregory Binda
*Assistant Examiner* — Josh Skroupa
(74) *Attorney, Agent, or Firm* — Gardere Wynne Sewell LLP

(57) ABSTRACT

A crankshaft flange protector comprising a cover having a top wall, a bottom wall and a sidewall, the top wall having a recessed portion formed of an interior sidewall and a recessed portion bottom wall sized to correspondingly receive and support the crankshaft flange therein.

2 Claims, 4 Drawing Sheets

CRANKSHAFT FLANGE PROTECTOR AND SUPPORT ASSEMBLY

BACKGROUND

Many types of engines, motors, transmissions and drive units have crankshafts or output shafts that transmit forces to their respective final drives (i.e., propellers, fans, rear axles, etc.) for the purpose of creating a motive force. In all cases, these shafts can have very specific handling requirements. For example, care must be taken when handling the crankshafts during manufacturing, assembly, and also during maintenance operations, since it is typically during these instances that crankshafts are most vulnerable to damage.

SUMMARY

Embodiments disclosed herein provide a protector and support member for a flange of a crankshaft, such as, for example, an automotive or aircraft engine crankshaft. Briefly, the flange protector comprises a cover member configured to be secured to the end of the engine crankshaft, and in particular, to a crankshaft flange. The cover includes a recessed portion formed to receive the crankshaft flange and incorporates circumferentially spaced apart openings extending at least partially through the flange. The openings are positioned to align with and receive corresponding extensions/openings disposed on the crankshaft flange, which are typically utilized to couple the crankshaft to a drive or output shaft. Once the flange is aligned and inserted within the recessed portion, the flange and cover can be secured together via one or more fasteners such as, for example, one or more bolts, which are inserted through the respective openings on the cover and crankshaft to secure the crankshaft and cover together. Embodiments provided herein also enable the cover to act as an adapter to secure the crankshaft to a support surface, such as, for example, a work bench, table or stand.

DETAILED DESCRIPTION

Figure 1:
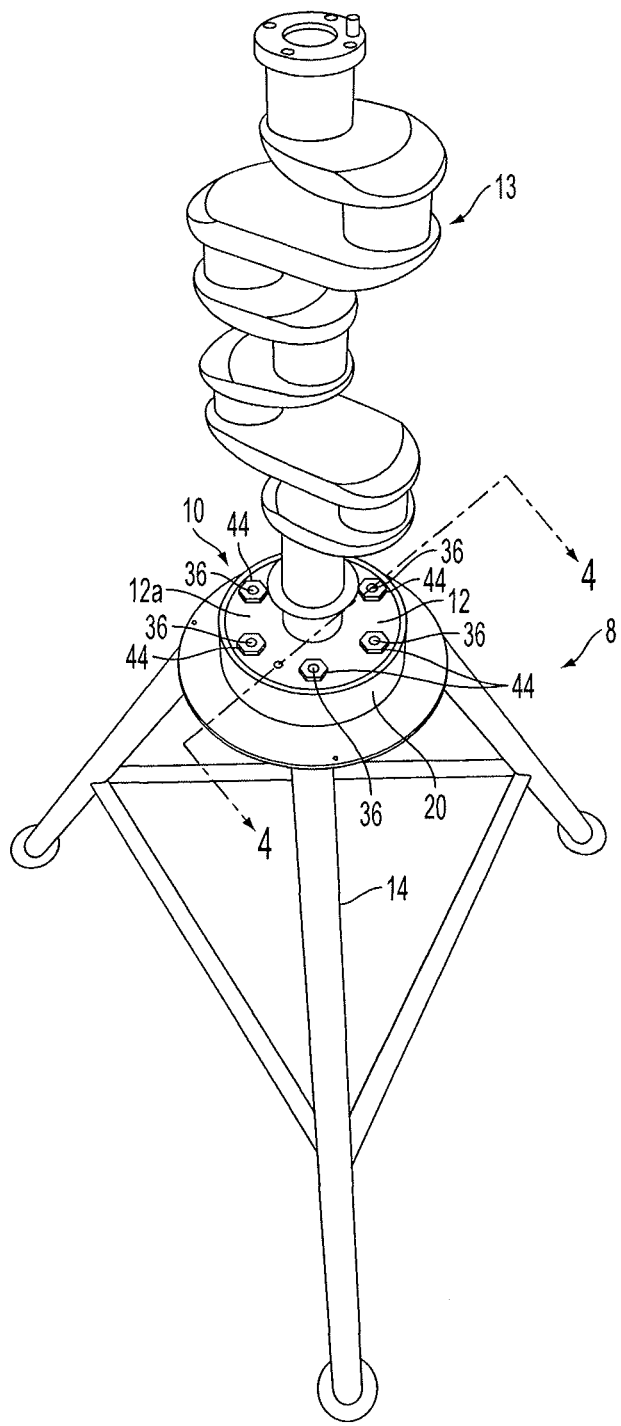
FIG. 1 is an illustration of a crankshaft flange protector and support assembly.

In the description which follows, like parts are marked throughout the specification and drawings with the same reference numerals, respectively. The drawings are not necessarily to scale and certain features may be shown exaggerated in scale or in somewhat schematic form in the interest of clarity and conciseness.

Figure 2:
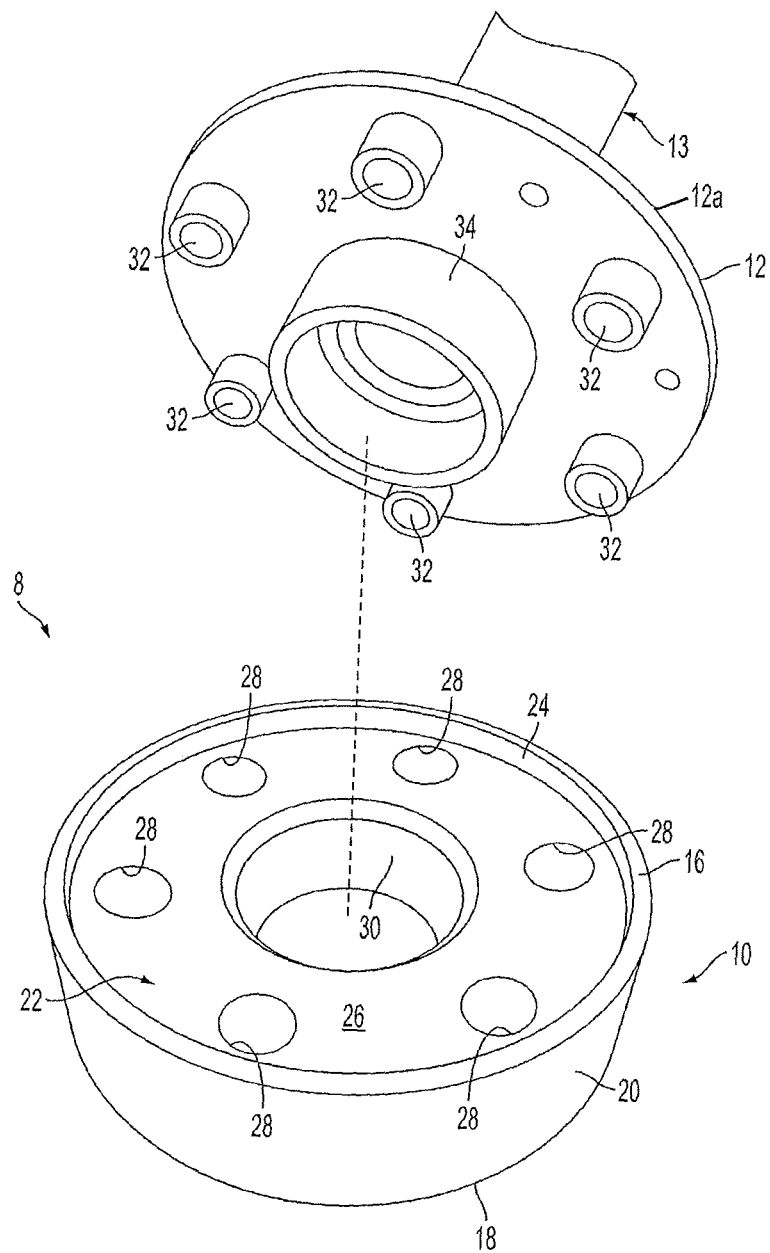
FIG. 2 is an illustration of the crankshaft flange and the top of the flange protector and support assembly of FIG. 1.
Figure 3:
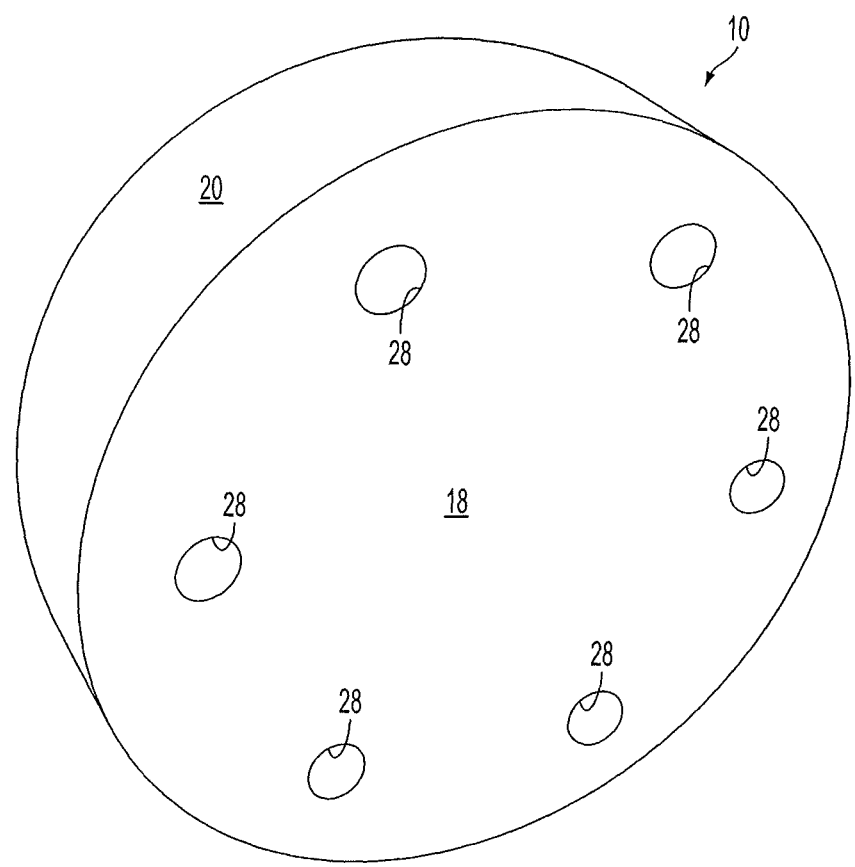
FIG. 3 is a bottom view of the flange protector and support assembly of FIG. 1.

Referring to FIGS. 1-3, a crankshaft flange protector and support assembly 8 is provided for protecting and/or otherwise supporting a crankshaft flange 12 disposed on an end of a crankshaft 13. Briefly, protector 8 comprises a cover member 10 and can be secured to flange 12 during storage, during engine assembly, as well as during repair, in order to protect the flange 12 against unwanted and/or otherwise accidental and potentially damaging contact. Cover member 10 is also operable to act as an adapter member to allow secure mounting of crankshaft flange 12 and thus crankshaft 13 to a support structure 14 such as, for example, a bench top, mobile toolbox, bench, stand or any suitable structure. This enables crankshaft 13 to be more easily repaired or maintained and at the same time reduce or substantially eliminate damage to flange 12 and/or crankshaft 13. In the embodiment illustrated in FIG. 1, cover member 10 is coupled to a support structure 14 consisting of a three-legged stand. In the embodiment illustrated herein, crankshaft 13 consists of an aircraft engine crankshaft; however, it should be understood that crankshaft 13 can be any type of crankshaft used in connection with any type of engine, motor, transmission or other drive unit.

Referring specifically to FIG. 2, cover 10 is generally circular in shape and comprises a top wall 16, a bottom wall 18 and an annular sidewall 20. Top wall 16 comprises a recessed portion 22 formed of an interior sidewall 24 and a recessed portion bottom wall 26 sized to correspondingly receive portions of the crankshaft flange 12. In FIG. 2, recessed portion 22 is formed of a depth to enable a top surface 12a of crankshaft flange 12 to be flush (or substantially flush) with top wall 16 of cover 12; however, it should be understood that the depth of recessed portion 22 may be greater such that top surface 12a is disposed below top wall 16.

In the embodiment illustrated in FIG. 2, recessed portion bottom wall 26 includes a plurality of spaced apart openings 28 extending through cover member 10 (i.e., extending between recessed portion bottom wall 26 and bottom wall 18) and around a central recess 30, all sized to receive corresponding portions of flange 12. However, it should be understood that openings 28 can be formed to only partially extend through cover member 10. In the embodiment illustrated in FIG. 2, openings 28 are spaced apart and positioned to align with and receive threaded openings 32 disposed on and extending from the end of the crankshaft flange 12. Openings 32 are adapted to receive and couple an aircraft propeller (not illustrated) to crankshaft flange 12 when crankshaft 13 is used in operation. Central recess 30 is sized to receive an annular extension 34 of crankshaft flange 12. Accordingly, as cover member 10 is mounted over crankshaft flange 12, crankshaft openings 32 are disposed at least partially within openings 28 and annular extension 34 is disposed within recess 30 such that flange 12 is substantially flush or, depending on the depth of recessed portion 22, disposed below top surface 16 to protect flange 12 against unwanted and potentially damaging contact thereto.

Figure 4:
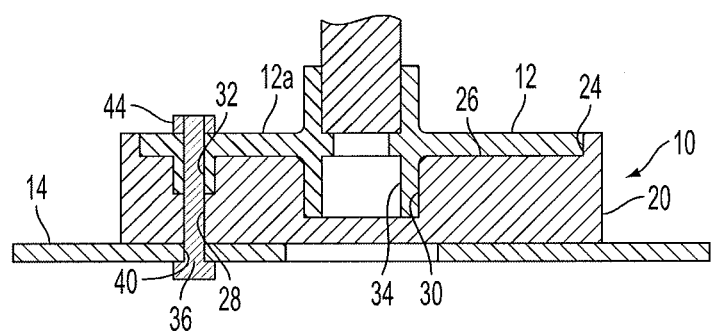
FIG. 4 is a section view of the flange protector and support assembly taken along the line 4-4 of FIG. 1.

As explained in further detail below, a connector member, which consists of bolts or screws 36 (best seen in FIGS. 1, 3 and 4) can be inserted through the respective openings 28 and 32 to secure crankshaft flange 12 and cover 10 together via a nut member 44. Optionally, bolts 36 can be sized such that the threads on bolt 36 engage the threads in openings 28 to avoid the necessity of any nuts 44 to secure crankshaft flange 12 to cover 10. For example, bolt 36 can be inserted through openings 28 on bottom surface 18 and extend into and engage threaded openings 32 on crankshaft flange 12. Accordingly, as bolts 36 are tightened, crankshaft flange 12 is secured within recessed portion 22. It should be understood that other methods of attachment are available to secure cover 10 to crankshaft flange 12. For example, external grip members and/or a friction fit arrangement could be utilized in addition to or in lieu of bolts 36 to secure cover 10 to crankshaft flange 12.

According to an embodiment of the present invention, cover 10 can be used as an adapter to couple and/or otherwise secure crankshaft 13 on support surface 14. For example, referring to FIGS. 1 and 4, one or more openings 28 are aligned with one or more openings 40 on support structure 14. Once aligned, bolts 36 are inserted through openings 28, 32 and 40 until a threaded end of bolt 36 extends therethrough to receive a correspondingly threaded nut 44 to secure crankshaft 13 and cover 10 to support member 14. It should be understood that according to some embodiments, cover 10 can be formed integral with support member 14.

According to embodiments disclosed herein, cover 10 can be manufactured from any suitable material including, but not limited to, steel, stainless steel, aluminum, titanium, brass, bronze, tin, zinc, plastics, NYLON, TEFLON and other materials that may include carbon fiber, polycarbonates, rubber, cork or the like. It should be understood that support assembly 8 can be used with various types of engines, motors, transmissions and drive units that have crankshafts or output shafts for transmitting power and forces to their respective final drives (i.e., propellers, fans, rear axles, etc.).

Although embodiments of the crankshaft flange protector and support assembly 8 have been described in detail, those skilled in the art will also recognize that various substitutions and modifications may be made without departing from the scope and spirit of the appended claims.

What is claimed is:

1. A crankshaft flange protector, comprising:
    a cover removably coupleable to a crankshaft, the crankshaft having a crankshaft flange connected to a first lateral end of a first portion of a shaft, wherein a second lateral end of the first portion of the shaft is connected to a lateral end of a second portion of the shaft by an arm and wherein the arm connects the first portion of the shaft to the second portion of the shaft such that a central axis of the first portion of the shaft is offset from a central axis of a second portion of the shaft;
    wherein the cover includes a top wall, a bottom wall and a sidewall, the top wall having a recessed portion formed to correspondingly receive and support the crankshaft flange therein;
    a plurality of connector members adapted to extend through a plurality of openings disposed within the recessed portion that are aligned with a plurality of corresponding openings in the crankshaft flange to secure the cover to the flange; and
    wherein the plurality of openings in the recessed portion are aligned with respective openings on a support structure to secure the cover to the support structure.

2. The protector of claim 1, wherein the cover is formed of steel.

* * * * *